Nov. 10, 1931.  E. H. HUSSEY  1,831,599

MAKING FIBER BOARD BY CONTINUOUS FILTER PROCESS

Filed Feb. 19, 1927  3 Sheets-Sheet 1

Inventor
Erwin H. Hussey

By (signature)

Attorney

Nov. 10, 1931. E. H. HUSSEY 1,831,599
MAKING FIBER BOARD BY CONTINUOUS FILTER PROCESS
Filed Feb. 19, 1927 3 Sheets-Sheet 2

Inventor
Erwin H. Hussey
By [signature]
Attorney

Nov. 10, 1931.  E. H. HUSSEY  1,831,599
MAKING FIBER BOARD BY CONTINUOUS FILTER PROCESS
Filed Feb. 19, 1927  3 Sheets-Sheet 3
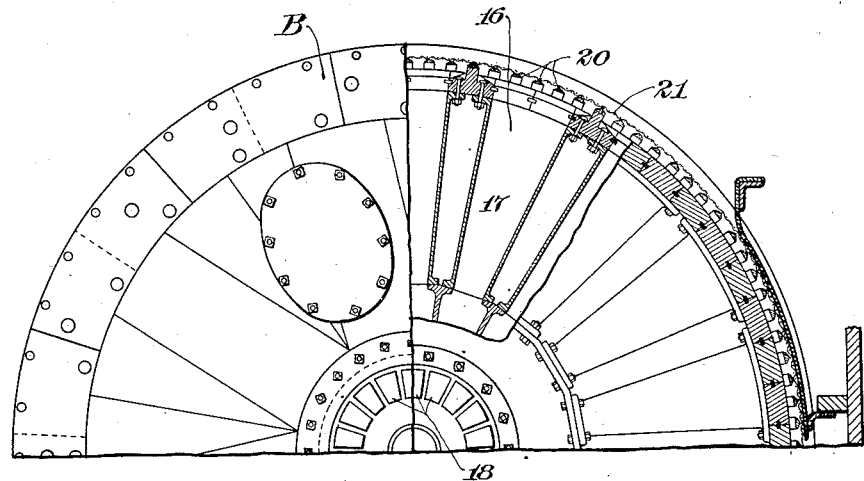
Fig. 6
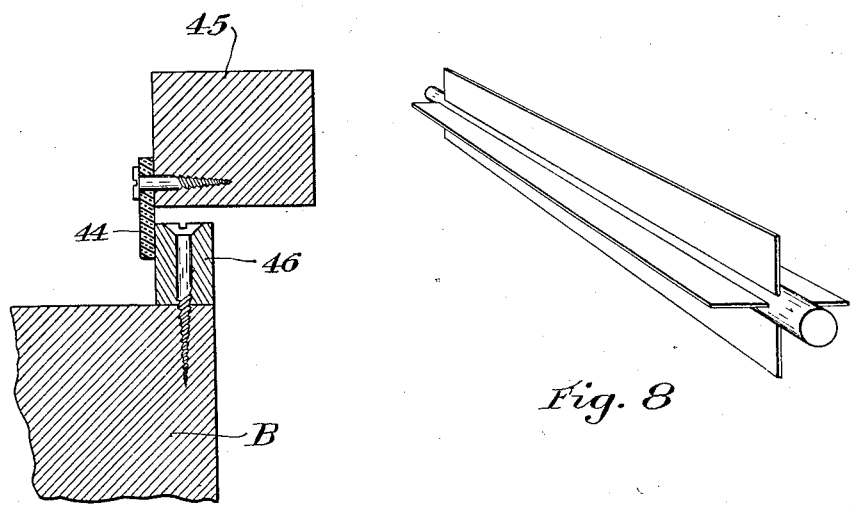
Fig. 7
Fig. 8
Inventor
Erwin H. Hussey
By Howard Leche
Attorney Patented Nov. 10, 1931

1,831,599

UNITED STATES PATENT OFFICE

ERWIN H. HUSSEY, OF MINNEAPOLIS, MINNESOTA

MAKING FIBER BOARD BY CONTINUOUS FILTER PROCESS

Application filed February 19, 1927. Serial No. 169,599.

My invention relates to the making of fiber board by continuous filter process wherein it is designed to make a continuous fiber board having an even density throughout the same and wherein the fibrous particles are interwoven with each other in different directions so that an even strength is provided in any direction of the sheet. This is a material advantage as it overcomes the tendency of the fibers to extend in a single direction as is true in the ordinary making of fiber board and paper sheets, and thus with my process I am able to make a fiber board which may be used as a wall-board or for any other purposes, and which may be of any desired thickness which is very desirable, owing to the increased strength of formation and general nature of the finished fibrous board or sheet wherein the grain does not run in any particular direction.

The primary object of my invention resides in means wherein a sheet can be collected in my process of making the same of any desired thickness in a single uniform thickness, and not built up in layers or different ply as has been done heretofore, in so far as I know. This feature of my process permits me to make wall-board and insulating material of a nature wherein the fibrous material is interlocked together, and will not separate into different layers, either in the process of making or when finished, and it is readily apparent that by the making of a board or sheet in continuous formation in this manner, I provide not only an insulating material but a wall-board and sheet structure which is to be desired over sheets and wall-board where the same is made up in layers and which layers are inclined to separate in handling the finished product. I believe that my process permits me to make a wall-board or sheet which may be preferred over the ordinary sheets which have been used heretofore and even the wood board where the grain is inclined to run in a certain direction, because in my process the fibers are permitted to be collected together in a manner so that they are interwoven and locked together, extending in a multiplicity of directions when collected from the stock solution and not being disturbed to be drawn out into a single direction, but being pressed together in this state, thereby forming a board with my process of a tough and very durable nature.

It is also a feature of my invention to provide a process wherein the stock solution is directed to the forming cylinder against the direction rotation of the forming cylinder. This permits the agitation of the stock solution so that the fibers do not all lie in the same direction and in fact are so agitated as to be picked up by the forming cylinder in every direction and thereby carrying out my process of making a board with the fibers interwoven and interlocked to provide the same. My process permits a vacuum which is equivalent of an extensive pressure, in fact, permits me to carry out the process in a much more desirable way for the making of fibrous sheet material as I am able to secure a vacuum which would be the equivalent of a very heavy pressure and not possible to secure under the ordinary former methods of making wall-board or fibrous sheets of this nature. Thus I am able to form fibrous sheet material much more rapidly than has been done heretofore, in so far as I know.

A further feature of my process is in a means of forming a sheet or board in a very simple, rapid and effective manner which consists in forming the desired thickness of sheet in a single rotation of the forming or collecting cylinder or means, and wherein the sheet is of a continuous formation throughout its depth or thickness, not consisting of several layers, but being of a single layer with interwoven fibers. This is important in my process as it permits the rapid formation of a fibrous sheet of board in a manner such as has not been accomplished heretofore and in a much shorter time and yet providing a sheet or board wherein the fibers are completely interwoven. My method of carrying out my process consists in applying a vacuum in a manner to form the sheet from nothing to the finished thickness desired in one revolution of the cylinder and at the same time drawing the fibers into an interlocking position so that the finished product has greater strength than similar boards made on the present type of equipment from the same material.

My invention includes a particular method of agitating the stock in the tank. I provide agitators positioned in the stock solution tank which are adapted to rotate in a direction of rotation with the forming cylinder and also an agitator at the surface of the stock in the tank which is adapted to rotate against the direction of the rotation of the forming cylinder and which prevents the increase in density or accumulation of stock where the forming cylinder leaves the solution. This agitator causes the thickened stock to be transferred to the thin solution and intermingled with the same so as to maintain a uniform consistency of stock in the tank of the forming cylinder.

A feature in carrying out my process is in the release of the vacuum on the forming cylinder at the proper time and place on the cylinder in relation to the last press roll so that the stock will be properly released from the forming cylinder and the action of the vacuum in a smooth and uniform manner. By this means I can take off the sheet without breaking or in any way marring the under surface of the sheet.

A feature in carrying out my invention consists in means of providing an apron sealing member on the side of the forming cylinder opposite to the forming side which extends down to the point of forming of the stock and which may be so formed as to extend down further over certain portions of the face of the forming cylinder, the purpose of which will be clearly set forth. In conjunction with the sealing apron I provide a sealing member and guard which keeps the stock from rising above a certain level at the back of the tank where the formation of the sheet first commences. The culmination of these two features allows the sheet to be formed across the lower edge of the seal continuously as the surface of the forming cylinder revolves past the lower edge of the sealing apron. The sealing apron seals the face of the cylinder so that the vacuum may be built up in the section as it passes the apron so that the same vacuum is effective on each side of the division strips after they pass the lower edge of the apron. By these means I am able to make an absolute uniform formation of sheet over the division strips.

It is also a feature of my invention to provide in the method a particular means of locating the cylinder in the tank so that uniform velocity is maintained around the surface of the forming cylinder. This is accomplished by offsetting the cylinder in relation to the tank wherein the cylinder is immersed and owing to the fact that the tank has a circular bottom. Thus the offsetting of the forming cylinder in the circular bottom tank provides a narrow space at the back of the tank where the forming starts, maintaining less material at this point, whereas at the opposite side of the cylinder a larger volume of material is maintained. This positioning of the cylinder provides a stock solution compartment about the portion of the forming cylinder in the tank which is adapted to gradually increase from the back to the front where the stock enters.

These features and objects of the invention, together with other details of my making fiber board by continuous filter process will be more clearly and fully set forth in the specification and claims hereinafter set forth.

To assist in describing and setting forth my process I have chosen to illustrate in the drawings:

Figure 6 illustrates a detail of a portion of the forming cylinder showing the vacuum sections.

Figure 7 is an enlarged detail of the sealing of the outer edges of the cylinder B.

Figure 8 is a diagrammatic detail of one of the paddles for the agitators 14 and 15.

Figure 1:
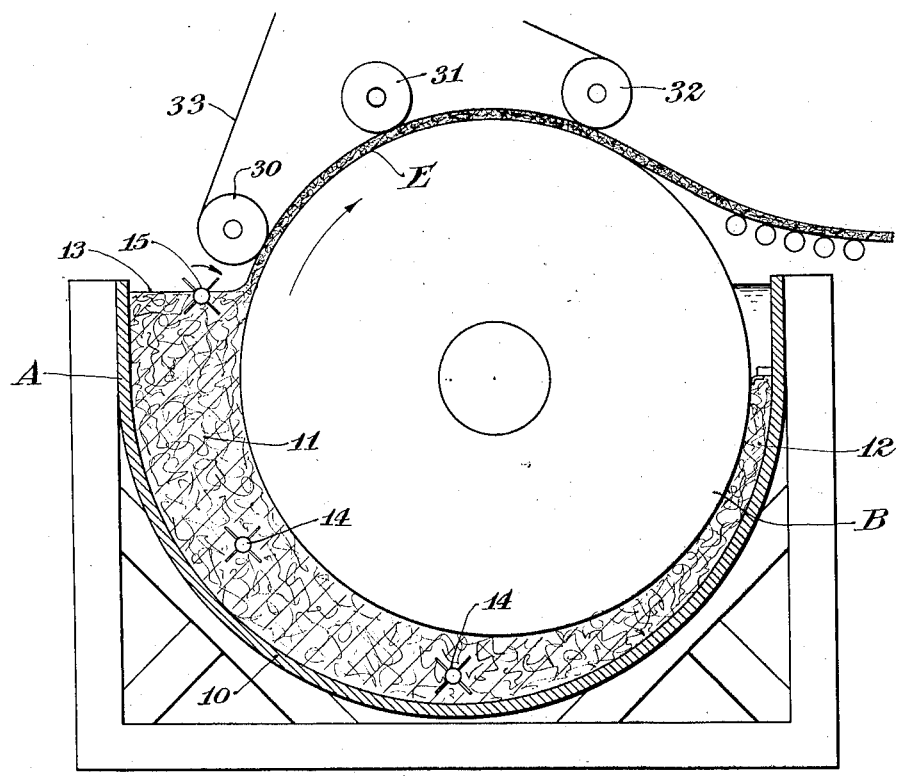
Figure 1 is a side diagrammatic sectional view of the filter apparatus used in carrying out my process.

My method consists in the making of fiber board or sheets by a continuous filter process and I have illustrated in the drawings a filter tank A with a forming cylinder B which is adapted to be used in carrying out my process in a simple and very effective manner.

A feature of the process consists in employing the tank A which may be made with a circular bottom 10 and in which the forming cylinder B is placed offcenter of the tank A as illustrated in Figure 1, to provide a stock solution compartment 11 in the tank A with a narrow portion 12 at the back of the tank where the forming of the fibrous material starts to take place in the operation of carrying out my process and with a gradually increasing formation to the compartment 11 around to the front of the tank where the stock solution is fed in at 13.

The positioning of the cylinder B in the tank A permits agitator paddle wheels 14 to be positioned at the lower portion of the tank which are adapted to rotate in a direction to direct the stock solution against the forming cylinder and in the same direction of travel as the forming cylinder. The forming cylinder B is adapted to be rotated in the direction of the arrow, as illustrated in Figure 1. I position an agitator paddle wheel 15 at the surface of the tank A in comparatively close relation to the forming wheel B and adapted to operate in the direction of the arrow or against the direction of travel of the forming wheel B. The lower agitators 14 keep the stock solution agitated in the operation of carrying out my process, while the upper agitating wheel 15 is adapted to prevent the increase in density or accumulation of stock where the forming cylinder leaves the solution. It is also important that this upper agitating member 15 causes the thickened stock to be transferred to the thin solution and intermingled with the same so as to maintain a uniform consistency of the stock in the tank at the top of the same where the forming cylinder leaves the stock solution.

The cylinder B is divided into sections 16 which are connected by passageways 17 to the valve openings 18. Thus the forming cylinder B is divided in a manner so that by means of a series of valve openings 18 circumferentially arranged near the axis of the cylinder, the vacuum in the different sections can be controlled through valve openings 18. By means of a series of slat members 20 positioned about the periphery of the cylinder B a screen 21 is supported on the face of the cylinder.

Figure 5:
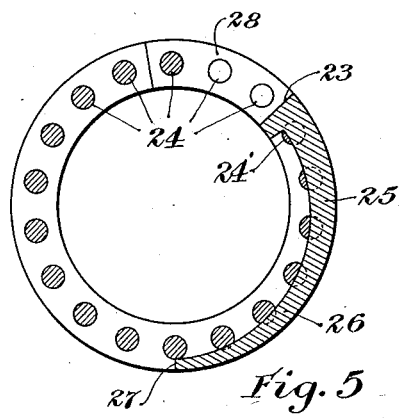
Figure 5 illustrates a portion of the valve mechanism used in the apparatus in carrying out my process.

I provide a valve control member 23, illustrated in Figure 5, which is provided with openings 24 which correspond to the openings 18 and are adapted to coincide with the same to regulate the vacuum about the surface screen 21 of the cylinder B. I place a tapered bridge of wood or metal 25 positioned so as to cut off the opening area of the openings 24 as illustrated in Figure 5. This bridge is positioned in a manner to extend in a helical formation so as to gradually decrease the covering of the consecutive openings 24 by the portion 26 of the member 25 so that at the extreme end 27 of the bridge 25 the opening 24 will be virtually wide open. This valve member controls the vacuum in the sections of the cylinder B and is adapted to be placed over the openings 18 in a manner well known in cylinders of this nature, excepting that I provide the bridge member 25, which, in so far as I know, has never been used before in carrying out a process of the making of fiber board.

The control valve ring member 23 is provided with a shut-off member or plate 28 which may cover any desired number of the openings 24. I have shown the plate 28 in Figure 5 associated with the valve ring member 23 in a manner so that the vacuum is released and cut off from the sections of the forming cylinder B at points on the cylinder illustrated in the diagrammatic lay-out of Figure 3. It is very important in my invention to provide the vacuum release at the proper point on the forming cylinder in relation to the take-off of the fiber sheet so that the same may come freely away from the forming cylinder without breaking or marring the under surface of the sheet, thereby permitting the fiber sheet to be made uniform on both sides and of a comparatively smooth nature. The release of the vacuum is so positioned in relation to the sections of the cylinder so that the pressing rolls and blankeː will extend over the first sections where no vacuum is apparent.

I provide press rollers 30, 31 and 32 which may be provided with a belt body and a brass face and are adapted to press the fibrous sheet E which is formed on the cylinder B against the surface of the cylinder B at the top of the cylinder, as illustrated in Figure 1. These rollers 30, 31 and 32 may be used with a pressure blanket 33 extending over the same and over the idle rollers 34 as illustrated in Figure 3 to cause an even pressure to be exerted against a comparatively wide surface extending from the roller 30 to the roller 32 and thereby providing means for uniformly pressing the felt sheet E on the top of the cylinder B as the felt leaves the tank A and is taken off at 36, just after it passes under the roller 32.

Figure 3:
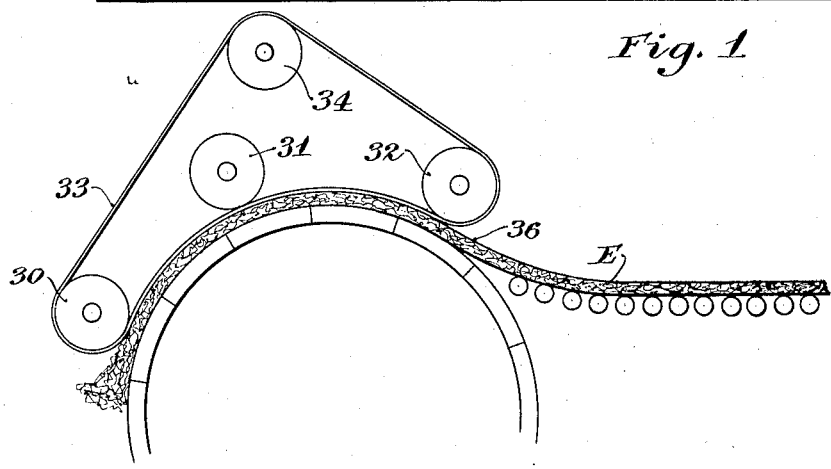
Figure 3 is a diagrammatic detail view of part of the apparatus used in carrying out my process.
Figure 2:
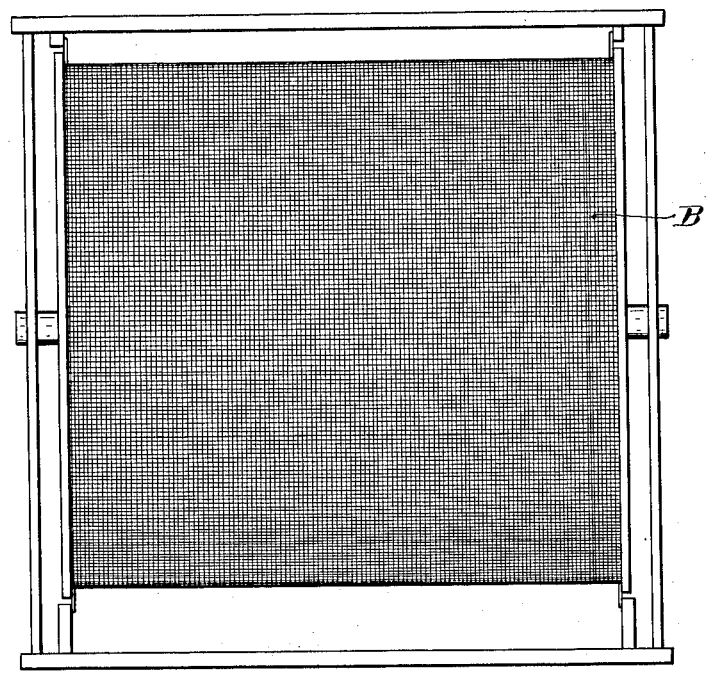
Figure 2 is a diagrammatic plan view of the filter roll and tank.

It will be noted that in Figure 3 I have illustrated diagrammatically the sections of the forming cylinder B and I have indicated the full vacuum in the sections up to a certain point under the pressing blanket 33, while the other sections indicate no vacuum to a point beyond the last pressure roller 32, so that the take-off at 36 of the fibrous sheet may be readily accomplished with both sides of the sheet perfectly formed and of a uniform nature on the outer surface.

Figure 4:
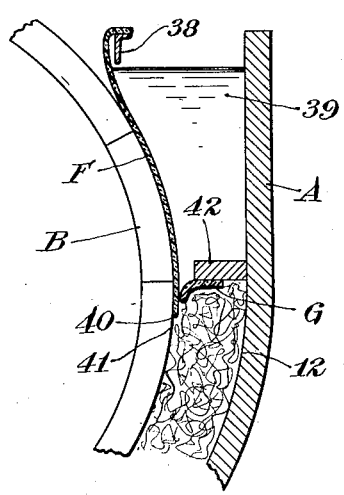
Figure 4 is an enlarged detail diagrammatically illustrating a part of the apparatus used in carrying out my process.

To assist in carrying out my process of forming fiber board or sheet material such as E, I provide a sealing apron F which is supported at 38 in any suitable manner to hold the upper end of the apron firmly in place. From the support 38 the apron drops down and is adapted to bear against the outer surface of the forming cylinder B in a manner to extend over the sections of the filter cylinder B as indicated diagrammatically in Figure 4. This sealing apron F provides a means of forming a clear water dam 39 in the tank A at the back portion 12 in conjunction with the sealing member G. The sealing apron F and the member G are formed of rubber or other flexible material so as to conform to the shape of the forming filter cylinder B and so that the member G will bear against the lower free edge 40 of the apron F.

A feature in carrying out my process is in means for forming a fiber sheet or board rapidly by the rotative action of a filter cylinder B and the complete formation of the board in one rotation of the cylinder, in fact, in actually less than the full rotation as the formed fibrous board or sheet is taken off at the top of the cylinder before a complete revolution has been made by the same. This process, therefore, provides a means for rapidly building up a sheet or board on the filter cylinder in the rotation of the same. The forming of the sheet in carrying out my process begins to take place at the point 41 on the cylinder B, the valve control ring 23 being positioned so that the opening 24′ directs a certain amount of vacuum, according to the area of the opening 24′ which is open as indicated in Figure 5, so that the filter cylinder B begins to pick up the fibers of the stock solution at the point 41 and as the cylinder B rotates, each opening 24 is gradually opened wider by the bridge member 25 until they are full open at the end 27 of the bridge member. The sealing apron F and the sealing member G, together with the transverse support 42 which holds the sealing member G provide a dam so that fresh water may be maintained in the portion 39 of the tank A and permitting the stock solution to rise in the back of the tank 12 up to the end 40 of the apron F and to the sealing member G. The stock solution at this point in the tank A is lighter than it is over on the front of the tank and the compartment for receiving the stock solution is narrower so that the formation of the fibrous sheet takes place gradually on the cylinder B from the point 41 around the same until it has reached its full desired thickness upon reaching the pressure cylinder 30 or as it passes out of the tank over the forming cylinder B.

The cylinder B is provided with end circumferential rubber sealing members 44 which are supported from the members 45 and the free edge of which bears against the projecting rim 45 on the face of the forming cylinder B. I have illustrated in Figure 8 diagrammatically one of the agitating paddles, however, it is apparent that these may be made in any suitable manner.

My invention consists in making fiber board by continuous filter process in forming of the sheet or board in one thickness, or one ply, by a single cylinder or collecting element which completes the operation of making the thickness of the sheet or board in one revolution. This method is carried out by applying a vacuum so as to gradually form the sheet up to the desired thickness continuously. The vacuum may be regulated so as to adjust and vary the thickness, however the machine or apparatus employed in making fibrous sheets or boards, is so set or adjusted as to make the desired thickness and then is run continuously for the desired length of time to make the desired amount of board or sheet fiber. Thus this process may be carried out to make fiber sheets or boards by a vacuum pickup which picks up the fibers from the starting point at the back of the cylinder where the vacuum is filled up by the sealing apron so that the moment the surface of the cylinder is exposed below the sealing apron, it immediately picks up a certain amount of fibers and as the valve plate 23 regulates the degree of vacuum from this point around to the take off part of the cylinder, as the vacuum is increased and the cylinder rotates around to the larger part of the tank A, the fibers are built up on the surface of the forming cylinder B by a filter process so that a single thickness sheet of the desired thickness is made in the single revolution of the forming filter cylinder B.

The invention includes the method of releasing the vacuum and removing the sheet from the cylinder without destroying the surface of the sheet after it has been formed. This is accomplished by relieving the vacuum before relieving the pressure on top of the sheet. By the rubber apron, a vacuum is built up so that the sheet is formed continuously across the lower edge of this sealing apron with a pre-determined vacuum at the start of formation. It is also very important in carrying out my process to feed the stock to the cylinder in opposite direction of rotation to the filtering cylinder B, so as to give a better sheet formation and interlocking the fibers which provides a sheet or board in a finished state of greater strength. This interlocking is accomplished by the filter process which draws the fibers on to the surface of the filter cylinder by a vacuum, thereby interlocking the fibers and more particularly owing to the fact that the stock solution is constantly agitated by the agitating means within the same. The method of agitating the stock solution in the tank of the forming machine, provides means for giving a uniform consistency and maintaining such consistency to the stock solution and the formed sheet on the filter cylinder. In carrying out my process it is important that the apparatus be so constructed as has been illustrated diagrammatically in the drawings, by the offsetting of the filter cylinder B in relation to the tank wherein the cylinder is immersed and by the circular bottom of the tank. It is apparent that with this positioning of the cylinder a narrower space is provided at the back of the tank where the formation is light on the filter cylinder while a larger area of stock solution is provided on the side of the cylinder where the deposit of the fiber stock and material is greater on the surface of the filter cylinder and the agitators keep the stock solution in uniform consistency to be formed on the cylinder.

The simplicity of carrying out my process is quite important when it is considered that the product made by my process is, I believe, superior to any that has ever been produced heretofore. The method of releasing the sheets from the filter cylinder without destroying the under surface of the sheet is a very important part in carrying out my process.

In accordance with the patent statutes I have described the principles of my process of making fiber board and sheet by a continuous filter process, and I desire to have it understood that my process may be varied and other apparatus may be used other than that which I have shown herein diagrammatically within the scope of the following claims without departing from the spirit of my invention.

I claim:

1. The method of forming continuously a fibrous sheet and board consisting in applying gradually a vacuum to a filter cylinder to form a sheet to the desired thickness.

2. The process of forming insulating sheet material of a fibrous nature consisting in continuously sucking the fibrous particles from the stock solution onto a moving surface and providing means for controlling the sucking action on the moving surface in a manner to start with predetermined velocity and gradually increasing the same to a point of completion and applying pressure at completion of the sheet formation and relieving the suction before the pressure is relieved to permit the sheet to be taken off.

3. The process of forming a fibrous sheet in one thickness continuously upon a filter cylinder comprising building up the sheet on the cylinder by a gradually increasing vacuum from a minimum thickness at the point of initial deposition to the desired thickness at another point on the cylinder in a manner to permit a continuous elongated sheet to be removed from said cylinder.

4. The process of making fiber board continuously upon a filter means comprising disposing fibrous stock solution into juxtaposition to said filter means, and depositing said stock upon said means by a gradually increasing vacuum in a manner to build up said board gradually from a minimum thickness at the point of initial deposition to the finished thickness to continuously form an elongated fiber board.

5. The method of forming a continuous fibrous sheet of ultimate uniform thickness upon a filter cylinder comprising depositing fibrous stock onto the cylinder by means of vacuum, and varying the intensity of the vacuum from a pre-determined minimum at the point where the deposition begins to a maximum at the point where the desired thickness is reached.

6. The making of single ply fiber board of predetermined thickness by a continuous vacuum filter process upon a filter cylinder which comprises controlling the vacuum in a manner to build up the intensity thereof gradually to the desired extent at a pre-determined point upon the cylinder and to shut off the vacuum at another predetermined point upon the cylinder.

7. The method of making a sheet and board continuously upon a filter cylinder consisting in applying a gradually increasing vacuum to gradually build up the sheet from a very thin deposit of fibers as a starting layer to the desired thickness upon the filter cylinder, and relieving the vacuum at a point on the cylinder in a manner to permit the sheet to be removed therefrom in elongated form without breaking the under surface of the sheet.

8. The making of a single ply fiber sheet of desired thickness upon a filter means by a process which comprises disposing fibrous stock solution into juxtaposition to said means, applying a gradually increasing vacuum to gradually build up the sheet from a thin deposit of fibers as a starting layer at the point of initial deposition to the desired thickness at a point upon said filter means remote from said first-mentioned point, relieving the vacuum at a point on the filter means immediately preceding the point of removal of the sheet from the said means, and removing the sheet from the filter means in an unbroken elongated form.

9. The process of making fiber board and sheet material comprising feeding fiber stock solution to the surface of a filter cylinder, which is permeable by the liquid constituent of the stock solution, under the influence of a gradually increasing vacuum, in such a manner that the board or sheet is built up from a very thin deposit at the point of initial deposition on the said surface to the desired thickness at another point on said surface.

10. The method of making continuous fiber sheet or board upon a filter means comprising building up a vacuum on said filter means to a pre-determined intensity at the point of initial deposition of the fiber so that the sheet is formed continuously at said point with a predetermined vacuum.

11. The process of making a fiber sheet upon a filter means comprising rotating said filter means, feeding fiber stock solution to said filter means in a direction opposite to the direction of rotation of the filter means, drawing the fiber stock against the filter means under the influence of vacuum, and regulating the intensity of said vacuum in such a manner that the fiber is first deposited in a very thin layer upon the filter means at a point remote from the point of introduction of the stock solution.

12. The process of making a fiber sheet upon a filter means comprising rotating said filter means, feeding fiber stock solution to said filter means in a direction opposite to the direction of rotation of the filter means, drawing the fiber stock against the filter means under the influence of vacuum, regulating the intensity of said vacuum in such a manner that the fiber is first deposited in a very thin layer upon the filter means at a point remote from the point of introduction of the stock solution, and agitating the stock solution so that the fibers will be extended in different directions to cause the same to be interlocked and interwoven with each other upon being deposited upon the filter means to form a continuous fiber sheet.

13. The process of forming sheet material upon a filter cylinder comprising disposing fiber stock solution in juxtaposition to said cylinder, maintaining a minimum quantity of fiber stock solution at the point of initial deposition, and maintaining a gradually increasing quantity of fiber stock solution adjacent said cylinder from said first-mentioned point to the point where the desired thickness is reached.

14. The process of forming sheet material upon a filter cylinder by a continuous vacuum filter process comprising disposing fiber stock solution in juxtaposition to said cylinder, maintaining a minimum quantity of said solution at the point of initial deposition, gradually increasing the quantity of solution adjacent the cylinder from said first-mentioned point to the point where the desired thickness is reached, and rotating said cylinder, whereby the fibers will be picked up with a uniform velocity around the filter cylinder.

15. The process of forming sheet material upon a filter cylinder by a continuous vacuum filter process comprising feeding fiber stock solution to the surface of said cylinder, maintaining a minimum quantity of said solution at the point of initial deposition, applying a pre-determined amount of vacuum at said point, and gradually increasing the quantity of solution adjacent the cylinder from said point to the point where the desired thickness is reached.

16. The process of forming sheet material upon a filter means by a continuous vacuum filter process comprising feeding fiber stock solution to the surface of said means, maintaining a minimum quantity of said solution at the point of initial deposition, applying a pre-determined amount of vacuum at said point, gradually increasing the quantity of solution adjacent said means from said point of initial deposition to the point where the desired thickness is reached, and gradually increasing the amount of vacuum from the point of initial deposition to said last-mentioned point.

17. The process of forming sheet material continuously upon a filter means comprising applying a gradually increasing vacuum to gradually build up the sheet from a thin deposit of fibers to the desired thickness, applying pressure to the resultant sheet, relieving the vacuum before relieving the pressure on the sheet, and then relieving the pressure, whereby the sheet may be removed from the filter means as a continuous and unbroken elongated sheet.

ERWIN H. HUSSEY.